INVENTOR
HERMAN R. SCHULZ
BY Thomas S. Ross
Joseph R. Spalla
ATTORNEYS

April 20, 1965   H. R. SCHULZ   3,179,888
METHOD FOR DETERMINING THE DIRECT CURRENT COMMON EMITTER
CURRENT TRANSFER RATIO OF TRANSISTORS
Filed Jan. 26, 1961   2 Sheets-Sheet 2
*Fig._2*
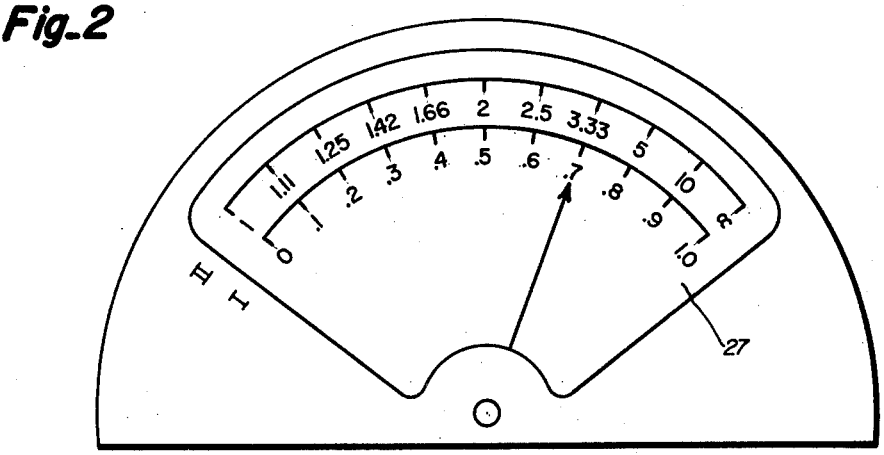
*Fig._3*
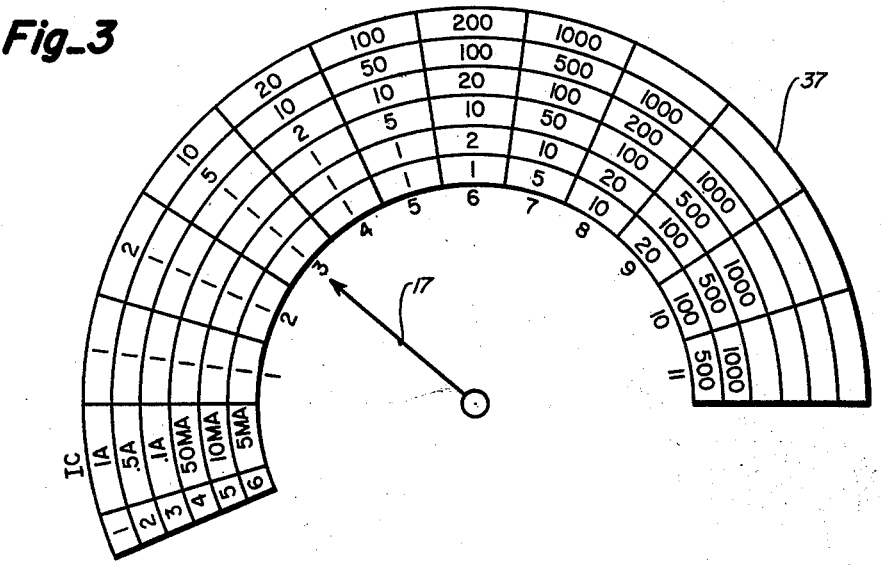
INVENTOR
HERMAN R. SCHULZ
BY Thomas S. Ross
Joseph R. Spalla
ATTORNEYS

United States Patent Office 3,179,888
Patented Apr. 20, 1965

3,179,888
METHOD FOR DETERMINING THE DIRECT CURRENT COMMON EMITTER CURRENT TRANSFER RATIO OF TRANSISTORS
Herman R. Schulz, Simsbury, Conn., assignor to Royal McBee Corporation, Port Chester, N.Y., a corporation of New York
Filed Jan. 26, 1961, Ser. No. 85,022
1 Claim. (Cl. 324—158)

This invention relates to a method and apparatus for determining D.C. characteristics of transistors; more particularly it relates to a method and apparatus for determining the large signal beta ($h_{FE}$) of a transistor.

Many transistor tester designed to measure small signal or A.C. beta ($h_{fe}$) are known. In switching applications, however, where the transistor is utilized as an on-off device, the parameter of major interest is the D.C. current transfer ratio ($h_{FE}$) or large signal beta. In the common emitter connection this parameter is defined as the ratio of collector current to base current i.e.

$$h_{FE} = I_c/I_b$$

and is usually determined by measuring the D.C. base current and the D.C. collector current and calculating $h_{FE}$ from the measurements taken. This is a laborious method subject to instrument and human error. A quick and reliable method of measuring this parameter is therefore highly desirable.

In accordance with the invention a differential vacuum tube voltmeter is employed to measure the difference between a fixed voltage $V_1$ and voltages $V_2$; the meter indicating full scale when $V_2 = 0$. From the $V_1 - V_2$ readings values of $V_2$ relative to $V_1$ are determined, ratios $V_1/V_2$ are computed and a meter scale marked. In brief, with the voltmeter scale calibrated to indicate ratios of voltages $V_1$ and $V_2$, a transistor, PNP or NPN, is connected in a test circuit, a load resistor is selected and the base current is adjusted until the voltage $V_1$ across the selected load resistor gives a full scale reading on the differential tube voltmeter. Thereafter the voltages $V_1$ and $V_2$ across the load resistor and a resistor in the base circuit respectively are applied to the input terminals of the voltmeter. The reading of the voltmeter multiplied by the ratio of the base circuit resistor and the load resistor is a measure of the beta ($h_{FE}$) of the transistor.

The primary object of the invention therefore is to provide apparatus for measuring beta ($h_{FE}$) of a transistor.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIGURE 2 is a view of a calibrated meter; and

FIGURE 3 is a view of a chart showing the ratios of base to collector resistors.

Figure 1:
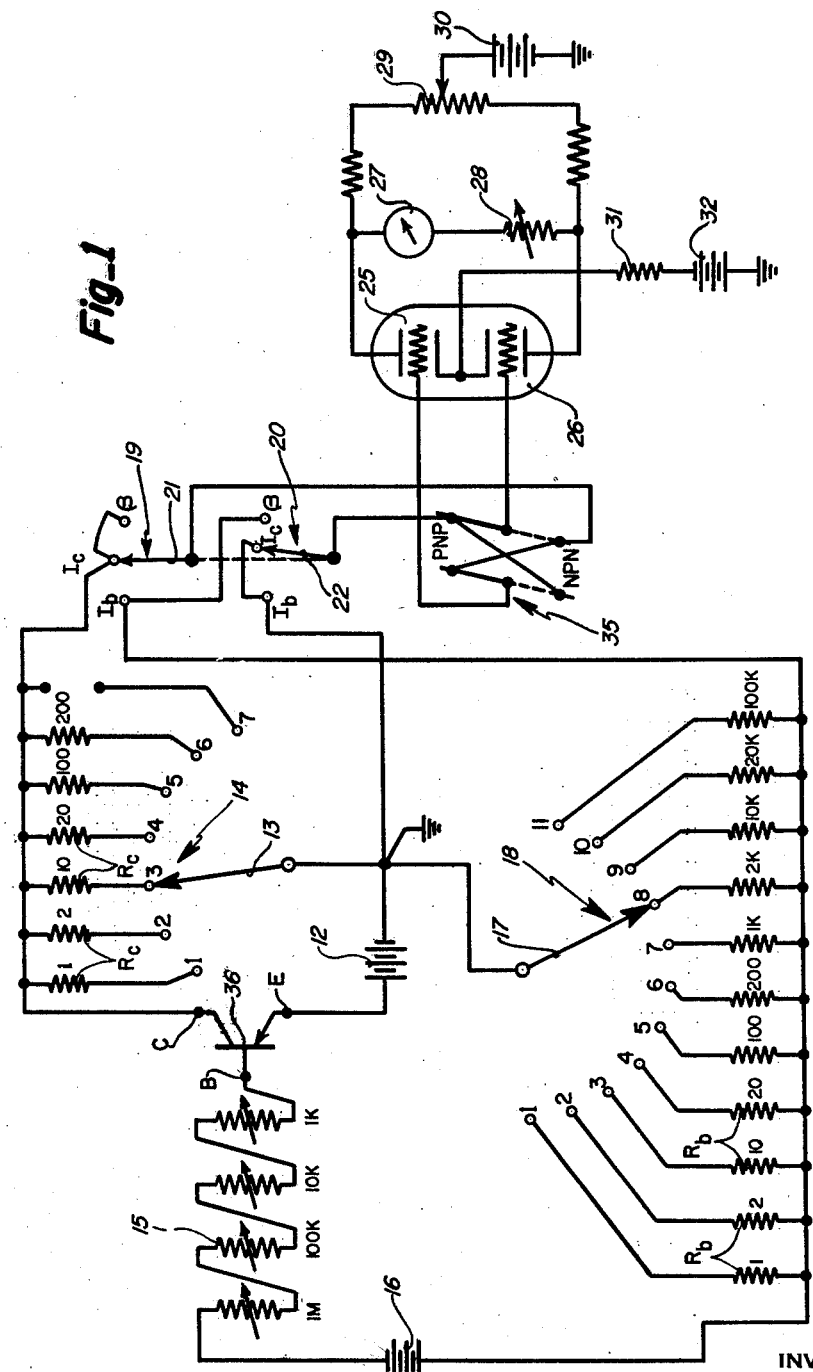
FIGURE 1 is a schematic view of a test circuit in accordance with the invention.

Referring now to the FIGURE 1 of the drawings there is shown a test circuit comprising three terminals C, B, and E to which the collector, base and emitter electrodes of a transistor to be tested are connected. The test circuit as shown is adapted to test a transistor of the PNP type. The emitter terminal E is therefore connected to the positive side of a battery 12 so as to bias the transistor emitter electrode in the forward direction. The collector terminal C is connected to the negative side of battery 12 via a selected one of a plurality of collector load resistors $R_c$ by means of the movable contact arm 13 of a multi position switch 14. The base terminal B is connected via base current adjusting resistors 15, a battery 16 poled in the same direction as battery 12, and a selected one of a plurality of base current measuring resistors $R_b$ by the movable contact arm 17 of a multi position switch 18 to the negative side of battery 12 which, as shown in the figure, is grounded. Two three position switches 19 and 20 having their movable arms 21 and 22 ganged are provided whereby the potential $V_1$ across the selected load resistor $R_c$ and ground, the potential across the selected measuring resistor $R_b$ and ground, and both the potentials across $R_b$ and $R_c$ may be connected to a measuring circuit when the movable contact arms 21 and 22 are in contact with stationary contact positions $I_c$, $I_b$ and $\beta$ respectively.

The measuring circuit is a balanced differential vacuum tube voltmeter comprising two triodes 25 and 26 having a microammeter 27 in series with a calibrating resistor 28 connected between the plates of the triodes. The plates are also connected via a zero balance potentiometer 29 to the positive side of a plate supply battery 30. The cathodes are connected through a bias resistor 31 to the negative side of a bias supply battery 32 whereby the grids will be positive with respect to the cathodes thereof and operation will be in the linear portion of the tube characteristic curves.

As shown in the figure the movable arms 21 and 22 of switches 19 and 20 are adapted to be connected to the grids of the triodes 25 and 26 respectively through a double pole double throw switch 35 shown in the PNP test position. The other position is the NPN test position. Also, when testing NPN transistors, the battery polarities will be reversed as is understood in the art.

The calibration of the voltmeter in units of beta is accomplished as follows. With both grids at ground potential the zero balance potentiometer 29 is adjusted so that the meter 27 reads zero. Thereafter a 1 volt signal $V_1$ is applied to the grid of triode 25 and the calibrating resistor 28 is adjusted so that the microammeter 27 reads full scale.

Thereafter signal voltages $V_2$ from, for example, $\frac{1}{10}$ of a volt to 1 volt in even increments are applied to the grid of triode 26 while maintaining 1 volt impressed on the grid of triode 25. The current flowing through the meter 27 is the difference in plate currents and therefore a function of the difference between voltages $V_1$ and $V_2$ applied to the grids of triodes 25 and 26. Since $V_1$ produces a full scale deflection, $V_1 - V_2$ will produce a deflection less than full scale. As shown on meter scale I in FIGURE 2 when $V_2$ is .1 volt the deflection will be $\frac{9}{10}$ of full scale; when $V_2$ is .2 volt the deflection will be $\frac{8}{10}$ of full scale etc. A meter scale II is then marked with the value of the ratio of voltages $V_1$ and $V_2$ which produced the meter deflections 0–1. In other words a meter reading of 1 on scale I indicates, and the meter is so marked on scale II, that $V_1$ and $V_2$ are in the ratio of 1/0 or infinity; a reading of .9 indicates that the voltages $V_1$ and $V_2$ are in the ratio of 1/.1 or 10; a reading of .8 indicates that the voltages $V_1$ and $V_2$ are in the ratio of 1/.2 or 5 and etc. As will hereinafter appear the scale II reading of 1 to infinity multiplied by the reciprocal of the resistance values across which the voltages $V_1$ and $V_2$ impressed on the grids are developed give the beta of the transistor.

Referring again to FIGURE 1, with the voltmeter calibrated in units of beta as explained above, a PNP transistor 36 is connected to terminals C, B, and E. Switch arm 13 is moved to place a selected load resistor $R_c$ in circuit and switch arm 17 may be set to any of its positions. The movable contacts 21 and 22 of switches 19 and 20 are then set to the $I_c$ positions as shown whereby the potential $V_1 = I_c R_c$ across the selected one of resistors $R_c$ is applied to the grid of triode 25. As is evident the grid of triode 26 is at ground potential in this position of movable contacts 21 and 22. Thereafter the base current adjusting resistors 15 which have a total value which is much greater than any one of the base current measuring resistors $R_b$, are adjusted so that $V_1 = I_c R_c = 1$ volt whereby the voltmeter eads full scale. The current $I_c$ drawn by the collector load resistors when $V_1 = 1$ volt may be marked at the various positions of switch 14 or on the ordinates of a chart 37 (FIGURE 3) beneath switch 18 as will hereinafter appear. The selection of a resistor $R_c$ determines a load line on the transistor $e_c$–$I_c$ characteristic and the adjustment of resistors 15 determines the operating point and therefore the beta of the transistor. Thereafter the movable contact arms of switch 19 and 20 are moved to the beta ($\beta$) positions and the deflection on meter scale II which is indicative of the ratio of the voltages $V_1$ and $V_2$ is read. Since by definition $h_{FE} = I_c/I_b$, substituting the values of $I_c$ and $I_b$ gives $h_{FE} = V_1/V_2/R_b/R_c$. In that meter scale II indicates $V_1/V_2$, multiplying the reading by the ratio $R_b/R_c$ gives $h_{FE}$. The ratio of $R_b/R_c$ may be determined readily from the chart 37 (FIGURE 3) placed beneath switch 18. Referring to FIGURE 3 the chart displays the computed values of $R_b/R_c$ at the various positions of switches 14 and 18. As shown the switch positions 1–6 of switch 14 are marked on a radial line to the left of the chart and the switching positions 1–11 of switch 18 are marked on an arcuate line. The intersection of the marked switch positions gives the $R_b/R_c$ ratio. The computed values shown result from the exemplary resistance values shown in FIGURE 1.

Should the product $I_c R_b$ be too small to produce a measurable displacement of the meter from full scale, switch 18 is adjusted to place a larger base current measuring resistor $R_b$ in the circuit which will cause a larger voltage drop $V_2$ thereacross. Since the value of the resistors 15 is so much greater than any one of the resistors $R_b$, the base current will not change appreciably.

Reviewing, $I_c$ may be read directly from the chart under switch 18 and $h_{FE}$ is determined by multiplying the meter scale II reading by the ratio of $R_b/R_c$ taken from the chart beneath switch 18.

$I_b$ may be calculated since $I_c$ and $h_{FE}$ are known or $I_b$ may be measured directly by placing the movable contact arms of switches 19 and 20 in the $I_b$ position. In the $I_b$ position the voltage $V_2$ developed across $R_b$ is applied to the grid of triode 25 with the grid of triode 26 at ground potential. From the meter reading of scale I thereof, which is a linear scale, $V_2$ is determined since full scale represents one volt. $I_b$ is then calculated by dividing the meter scale I reading by $R_b$.

It should be understood that the foregoing disclosure relates to only a preferred embodiment of the invention and that it is intended to cover all changes and modifications of the example of the invention herein chosen for the purposes of the disclosure, which do not constitute departures from the spirit and scope of the invention.

The invention claimed is:

A method for determining the direct current common emitter transfer ratio of a transistor with a differential vacuum tube voltmeter calibrated to indicate the ratio of voltages $V_1$ and $V_2$ applied to the input terminals thereof, said voltmeter being adjusted to read full scale when the value of $V_2$ is zero, comprising the steps of connecting a transistor in a common emitter circuit configuration including biasing means, a selected collector current measuring resistor, and a selected base current measuring resistor, applying the voltage across said collector resistor to the input terminals of said voltmeter, adjusting the base current whereby said meter reads full scale, thereafter applying the voltage developed across said base and collector resistors to said input terminals of said voltmeter and multiplying the voltmeter reading by the ratio of said base resistor to said collector resistor.

References Cited by the Examiner

UNITED STATES PATENTS

| | | | |
|---|---|---|---|
| 2,946,008 | 7/60 | Kallmann | 324—158 |
| 3,025,468 | 3/62 | Thomas | 324—158 |
| 3,059,183 | 10/62 | McCallister | 324—158 |

OTHER REFERENCES

A Transistor D.C.-A.C. Beta Tester (Sylvon), Electronic Industries, October 1958, pages 90–92.

Transistor Test Set (Prewett), Wireless World, August 1958, pages 369–372.

WALTER L. CARLSON, *Primary Examiner.*

LLOYD McCOLLUM, *Examiner.*